United States Patent

Lyon

[15] 3,640,442
[45] Feb. 8, 1972

[54] STOCK PUSHER

[72] Inventor: Gilbert T. Lyon, 22501 Rio Vista, St. Clair Shores, Mich. 48081

[22] Filed: Mar. 16, 1970

[21] Appl. No.: 19,818

[52] U.S. Cl. ............................................226/158, 279/1 Q
[51] Int. Cl. ......................................................B65h 17/34
[58] Field of Search....................226/158, 167; 279/1 Q, 41, 279/46

[56] References Cited

UNITED STATES PATENTS 3,549,072  12/1970  Kinori....................................226/167
3,272,447  9/1966  Ewing.....................................279/1 Q
3,404,822  10/1968  Green.....................................226/158
2,426,200  8/1947  Green.....................................279/41 X

*Primary Examiner*—Allen N. Knowles
*Attorney*—Burton and Parker

[57] ABSTRACT

This disclosure relates to a stock pusher for use in automatic screw machines or the like and includes a urethane rubber body having a passageway therethrough for grippingly engaging the stock to be pushed. The urethane body may be either permanently or removably secured in the pusher shell at the end of the stock feed tube.

7 Claims, 10 Drawing Figures

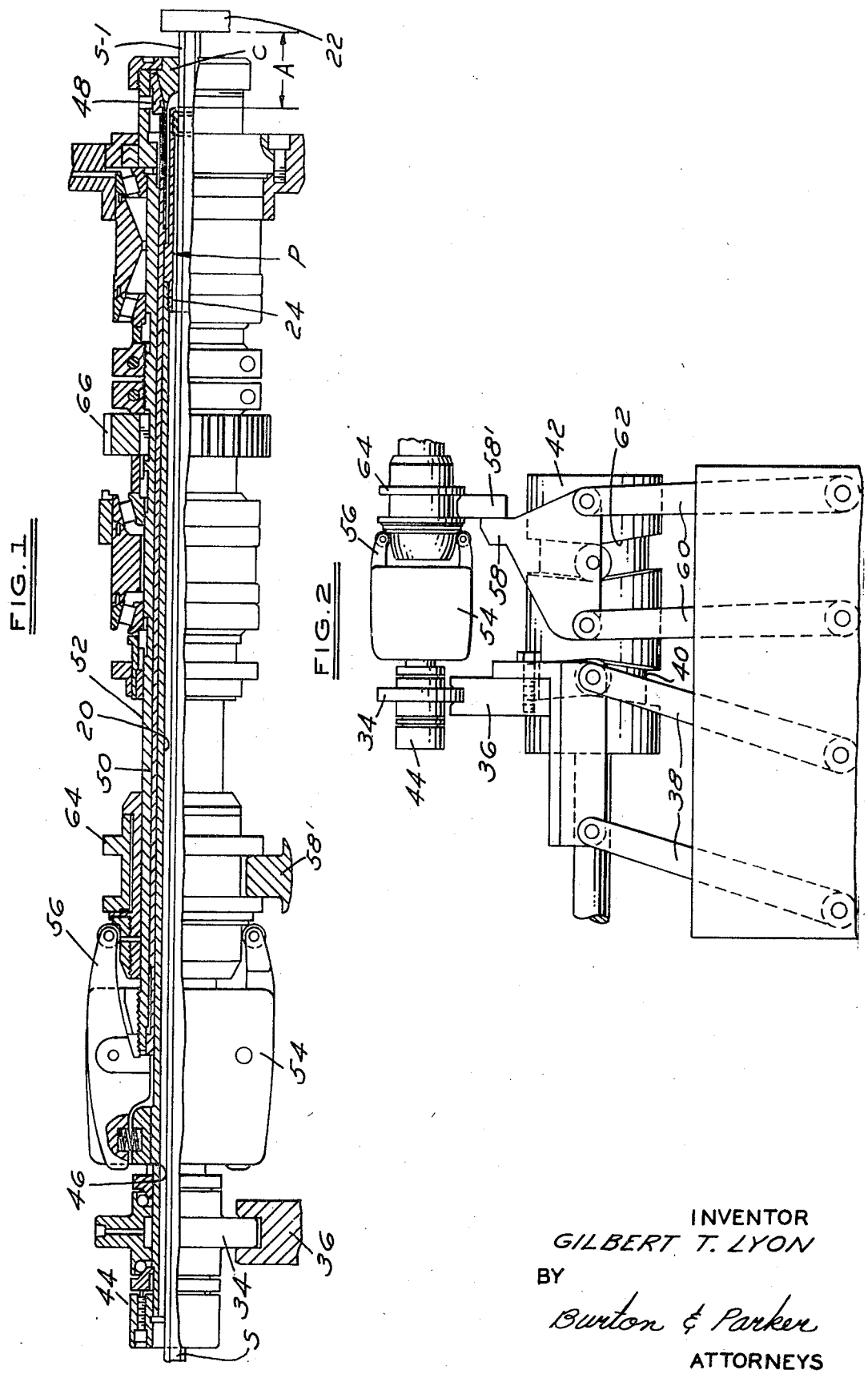

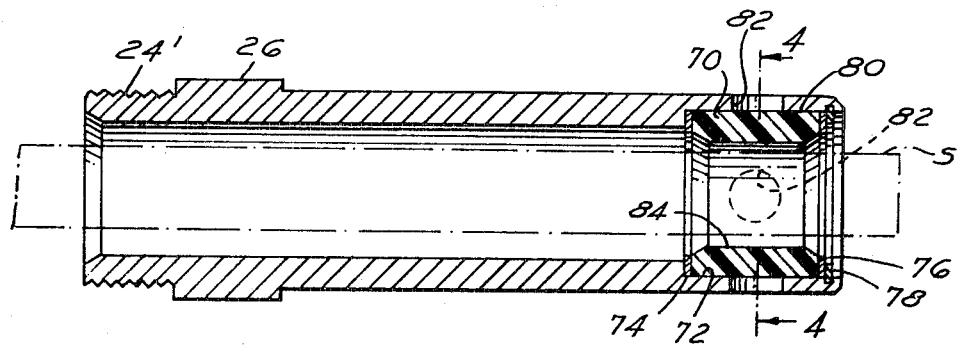
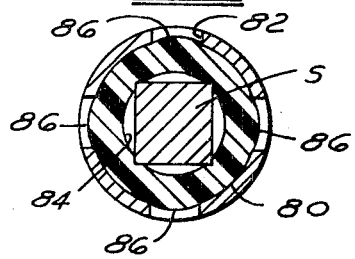
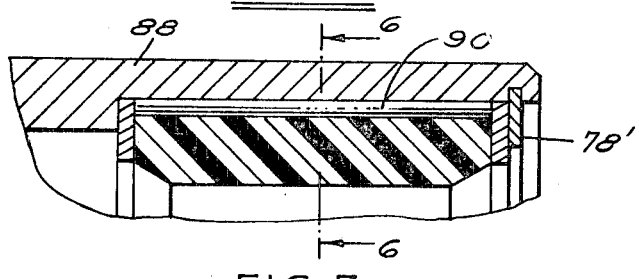
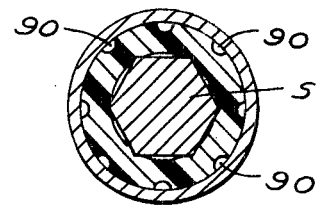
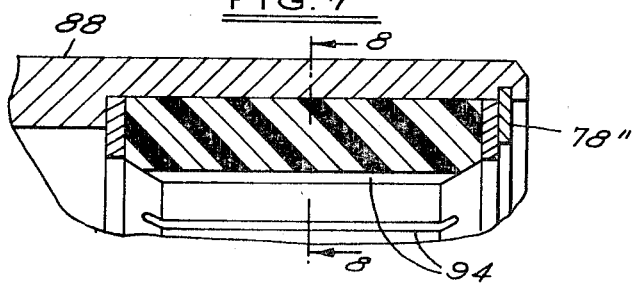
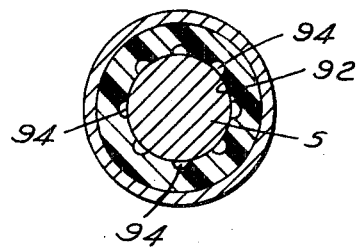

PATENTED FEB 8 1972

INVENTOR
GILBERT T. LYON
BY
Burton & Parker.
ATTORNEYS

STOCK PUSHER

BACKGROUND OF THE INVENTION

This invention relates to stock pushers such as are used in automatic screw machines or the like.

Over the years stock pushers for automatic screw machines have generally been of three types. First, there is the pusher utilizing a plurality of resistingly expansible and contractable steel fingers or pads between which the stock is fed and which grips the stock to push it. The stock engaging surfaces may be of hardened steel. A second-type pusher utilizes fingers made of a softer metal such as bronze or brass. A third type has stock engaging portions made of natural or neoprene rubber. In the case of the first type the steel fingers or pads, though having a long life, tend to scratch the stock and leave undesirable scratch marks on the finished product. The second type though not giving rise to the marring of the stock, generally has a relatively short life. The third type does not wear well and therefore has a short life. Much time is wasted by the machine operator in attempting to prevent scratching of the stock by the steel pushers, and the frequent breakage or rapid wear of the brass or bronze pushers necessitate frequent shutdowns of the machines and replacement. With the natural rubber or neoprene pushers slippage between the pusher and the stock often result in unsatisfactory machine operation. As a consequence there has been a long felt need in industry for a stock pusher that will alleviate the problems of the prior art pushers.

Among patents relating to stock pushers the following are of interest showing the state of the art:

| | | |
|---|---|---|
| 2,259,605 | 2,624,102 | 2,866,648 |
| 2,369,321 | 2,705,643 | 2,895,740 |
| 2,426,200 | 2,810,585 | 3,404,822 |

SUMMARY OF THE INVENTION

The principal object of this invention is the provisions of a stock pusher which has a long life, will not mar the stock, will maintain a good grip on the stock throughout its useful life without undesirable slippage, and will allow insertion of the bar stock thereinto without internally cutting or tearing the pusher.

Other objects include the provision of a pusher which will centralize the bar stock so that it will be concentric with the axis of the machining operations, will help reduce vibration of the bar stock thereby improving surface finish on the stock at the machining area, will reduce chatter of the stock during machining which sometimes occurs with the present commercially available pushers, will allow a machine having a positive cam stroke feed to use a maximum amount of the bar stock without imposing undue strain on the stock-feeding mechanism, may be used in existing automatic screw machines and the like without necessitating any changes therein, which is of such design that the pusher may be readily removed and replaced by another of the same or a different size, and finally which is of reduced cost over the existing commercially available pushers.

I have discovered that if the pusher is made in the form of a tubular block of urethane rubber having the characteristics hereinafter described, that it will not only satisfactorily grip the stock even though the latten is oiled and/or covered with corrosion-resistant coating, but it will stand up for extended periods of use, will not mar the stock, and in addition, one pusher will accommodate different sizes and shapes of stock. In one test 50,000 screw machine parts were made in a screw machine provided with this improved urethane rubber pusher, and when such production run was completed and the pusher examined, it was found to be substantially in as good condition as when originally installed, and capable of continued satisfactory use for many more thousand operations in the screw machine.

Urethane rubber has been commercially available since about 1950, and was known for many years prior to that, but so far as I am aware no one has suggested that it be used for a stock pusher. At least two characteristics of urethane seemingly argue against its usage: First, urethane has a lower coefficient of friction than either natural rubber or neoprene, both of which tend to slip, particularly on oily bar stock, and therefore to use urethane would appear illogical; Second, urethane of a hardness suitable for use as a pusher has a much greater tendency to take a permanent set than natural rubber or neoprene, therefore reducing its grip on the stock and militating against the selection of urethane.

Contrary to the foregoing apparent drawbacks of urethane, I have found that if it is so shaped as to minimize its objectionable characteristics and compounded to emphasize certain attainable characteristics, a pusher can be thus provided meeting the aforementioned objects and of surprisingly long life.

In the drawings

FIG. 1 is a side elevation partly in section through the spindle assembly of a typical automatic screw machine, such as a Greenlee machine manufactured by Greenlee Brothers & Co. and described in a brochure of such company published July 1949, and showing my improved pusher mounted therein;

FIG. 2 is a side elevation of the collet lever assembly for the spindle of FIG. 1;

FIG. 3 is a cross-sectional view through a first form of pusher for mounting on the end of the feed tube of the spindle assembly showing one form of the pusher body, with a length of bar stock shown in phantom outline extending through the pusher;

FIG. 4 is a cross-sectional view taken on the line 4—4 of FIG. 3 and showing in cross section a piece of bar stock in the pusher;

FIG. 5 is a cross-sectional view through a portion of a second form of pusher;

FIG. 6 is a cross-sectional view through the modified form of pusher shown in FIG. 5 taken substantially on a line 6—6;

FIG. 7 is a cross-sectional view through a third form of the pusher;

FIG. 8 is a cross-sectional view through the pusher of FIG. 7 taken substantially on the line 8—8;

Figure 9:
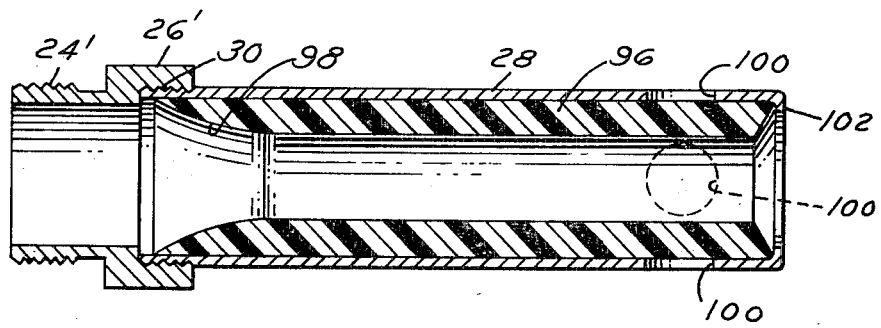
FIG. 9 is a cross-sectional view through a fourth form of pusher.

To provide certain background and environmental information I have shown in FIGS. 1 and 2 a spindle assembly of a typical automatic screw machine, such as a Greenlee machine. There are a number of such spindle assemblies in a screw machine each adapted to support and automatically feed stock to and hold it at a plurality of work stations. The spindle assemblies may be part of a turret which rotates all of the assemblies in a step-by-step motion from one work station to the next, or in other forms of screw machines the spindle assemblies may be rotationally stationary and the tools to perform the work may be mounted in a rotating turret. In any event the stock S, which typically is in the form of a long bar or rod, either of polygonal or cylindrical configuration, is fed axially by the assembly into a working position S–1 and for this purpose is generally received through a reciprocable stock feed tube 20 which supports the stock. On the end of the tube is a pusher P which grips the stock and pushes it into the work station. The pusher reciprocates on the stock from a retracted position to an extended position, the latter being shown in FIG. 1. In the retracted position it engages the stock for movement to the extended position. In the extended position the stock is at the work-performing position. Some form of stop means, schematically indicated at 22, is provided for limiting the amount that the stock can project beyond the pusher.

In FIG. 1 the pusher P is mounted on the end of the stock feed tube, the feed tube being interiorly threaded to receive exterior threads 24' on the pusher shell 26. In FIG. 3 the pusher shell is an integral member while in FIGS. 9 and 10 the shell comprises a shell holder 26' and 26" respectively, and a cylindrical tube 28 or 28' either exteriorly threaded to be received in threaded engagement within the holder 26' as at 30, or interiorly threaded to be threadedly received over the shell holder as at 32 in FIG. 10. The feed tube 20 is reciprocated by a collar 34 surrounding the tube and shifted by a shoe assembly 36 supported by links 38 and engaging a cam track 40 in a drum 42 as shown in FIGS. 1 and 2. The collar is held against axial shifting relative to the tube by a nut 44 and a shoulder 46 of the tube.

The bar stock S is held in the work-performing position by a collet C received in and riding the inside of a collet closing sleeve 48 secured on the end of a collet tube 50 supported within the spindle 52. A collet lever body 54 carrying spring-loaded collet levers 56 is mounted on the spindle with the levers overhanging the opposite end of the collet tube from the collet and operable, when in the position shown in FIG. 1, to lock the collet on the bar stock S. A collet operating shoe assembly 58 supported on links 60 and riding a cam track 62 in the drum 42, has a portion 58' engaged in a groove in a collet spool 64 axially shiftable on the spindle to actuate the collet levers 56. When the spool is shifted to the right the levers 56 pivot to release the collet tube permitting the collet to open, and when the spool shifts to the position shown the levers are returned to force the collet to grip the bar stock. The spindle assembly is rotated by a gear 66 meshing with a gear train (not shown) in the screw machine. The presence and operation of other portions of the screw machine and spindle assembly will be apparent to those skilled in the art and need not be described.

Assuming the work has been performed on the projecting end of the bar stock and the end cutoff so that it is desired to feed the bar to the right to project the newly cut end into a work-performing position, the following sequence occurs. The drum is rotated to cause the shoe assembly 36 to shift to the left carrying with it the feed tube 20 and pusher P, while the collet C remains locked on the bar stock. When the pusher is thus retracted continued rotation of the drum 42 causes the collet operating shoe assembly to shift spool 64 to the right unlocking the levers 56 and in turn the collet C from the bar stock. Continued rotation of drum 42 then causes the shoe assembly 36 to shift to the right thereby correspondingly shifting the feed tube and pusher. As the pusher moves to the right during its feed stroke it draws the bar stock S with it moving the stock against the stop 22. Continued rotation of drum 42 now shifts spool 64 to the left actuating the levers 56 to lock the collet upon the bar stock and the stock is now ready for the work-performing operation on its projecting end S-1.

In order to load a fresh length of bar stock in the spindle assembly, the operator inserts the end of the stock at nut 44 and pushes it down to and through the pusher P and into the collet C. Unless the end of the stock has been beveled prior to inserting it in the feed tube, and often it has not been, it is apparent that the relatively sharp end of the stock may tend to damage the pusher P as it passes therethrough. Also it will be noted that during retraction of the pusher it slides on the bar stock and that during extension it must grip the stock sufficiently tightly so as to shift the stock to its extended work-performing position bringing the stock up against stop 22. During this latter movement if the bar stock is carried sharply against the stop and the pusher does not exert enough holding force on the stock due to wear or expansion of the pusher there is a tendency of the stock to bounce back from the stop and thus the pusher must desirably prevent such bounce back to ensure the full projected amount of stock is available for the work-performing operation. Also, it is desirable that the pusher project the maximum amount of stock as the bar nears the end of its useful length without at the same time damaging the pusher. An inspection of FIG. 1 will show that the dimension A represents the shortest length of stock, and that if the tail end of the stock is sharp or somewhat deformed there would be a tendency as the pusher pushed against such end to damage the pusher. Yet if the maximum amount of bar is to be used up the pusher must be able to push against such end without being damaged.

Each of the pushers shown in the drawings includes a block of urethane having concentric cylindrical exterior and interior surfaces, and housed in a closely fitting pusher shell with opposite ends trapped behind radially extending wall or shoulder portions and either the exterior or interior of the block or the shell is relieved to allow displacement of the urethane as the bar stock is inserted through the bore of the block and during relative movement of the block on the bar stock. In addition, opposite ends of the bore are chamfered to facilitate insertion of the end of bar stock through the pusher and prevent gouging and tearing out of portions of the block during insertion and as the last of the stock is used up.

Referring to FIG. 3, the block 70 of urethane rubber is removably received in a counterbore 72 in the shell with a pair of flat washers 74 and 76 overlying the axially opposite ends of the block, and a snap ring 78 received in a suitably provided groove in the shell retains the block against dislodgement. The exterior wall 80 of the block is cylindrical and is a slip fit within the counterbore. The latter has a plurality of equidistantly spaced apertures 82, four in this instance being provided, which will allow the urethane to be laterally displaced as the end of the bar stock or workpiece S is inserted through the bore 84 of the block. The bore is also cylindrical and will accept either a cylindrical- or polygonal-shaped length of stock, such as shown in FIGS. 4, 6 and 8 at S. The diameter of the bore 84 should be such that the block tightly grips the bar stock. Because the bar will cause displacement of the urethane, some of the urethane will enter the apertures 82 as at 86 in FIG. 4 where the displacement has been exaggerated for purposes of illustration. Both the exterior configuration of the bar stock as well as its outside dimension may vary and still be usable in a given pusher as long as a tight grip of the stock is achieved. The washers 74 and 76 will resist elongation of the block under the radial outward compression of the stock against the block.

The embodiment of FIG. 5 is similar to FIG. 3 except the pusher shell 88 is not provided with the apertures 82 and to allow for displacement of the urethane upon insertion of the bar stock the exterior of the block is provided with a plurality of equidistantly arranged axially extending grooves 90. The embodiment of FIG. 7 differs from that of FIG. 5 only in that the grooves are in the wall of the bore 92 as at 94 and the urethane can be displaced into such grooves. In both embodiments the grooves are relatively shallow.

Figure 10:
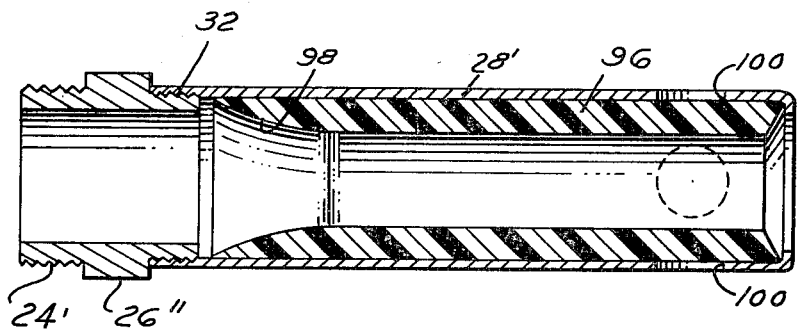
FIG. 10 is a cross-sectional view of the pusher of FIG. 9 but with a different form of connection of the pusher shell to the shell holder.

The embodiments of FIGS. 9 and 10 are identical insofar as the urethane block is concerned. The block 96 has a very smooth and gradual taper 98 at the stock-entering end to guide the end of the bar stock into the bore and the shell is provided at the opposite end with a plurality of equidistantly spaced apertures 100 to allow for displacement of the urethane as in the FIG. 4 embodiment. In both embodiments the urethane is retained in place by adhesive securement or bonding to the interior of the shell. The end of the shell opposite the threads is inturned at 102 to overlie the adjacent end of the urethane block to assist in retaining the block in the shell. The apertures 100 both in the embodiments of FIGS. 9 and 10 as well as FIG. 3 allow displacement of the urethane as the end of the stock approaches the end of the block adjacent the apertures such that the tendency of the end of the stock to tear out chunks of the block at such end is obviated.

The embodiments of FIGS. 9 and 10 contemplate that when the urethane block has worn out to the point where it no longer is capable of rendering satisfactory service, the shell portion 28 (FIG. 9) or 28' (FIG. 10) may be unscrewed from the portion 26' or 26" respectively and discarded, and a replacement shell portion threadedly connected to the supporting portions 26' and 26". In this fashion replacement cost is minimized.

In the embodiments of FIGS. 3, 5 and 7 when the urethane blocks have worn sufficiently so that they cannot render further satisfactory service, the snapring 78 shown in FIG. 3 and the corresponding rings 78' and 78'' of FIGS. 5 and 7 are removed and the urethane blocks withdrawn and replacement blocks inserted followed by installation of the snaprings.

As a result of extensive tests I have determined that there are three physical properties of the urethane which are critical and must be met in order to provide a satisfactory pusher. The first of these is the tear strength of the urethane; the second is its compression set; the third is its compression modulus. The pusher should have good tear strength characteristics to resist gouging or tearing by rough or sharp edges or burrs on the bar stock. This is particularly important when the end of the bar stock is initially forced through the passageway of the pusher. My testing of the urethane pusher has indicated that the tear strength should be at least 200 pounds per linear inch, and preferably about 500–600 pounds per linear inch, based on either ASTM D–470 or the Instron split tear test criteria referred to in a publication of the Elastomer Chemicals Department of E. I. du Pont de Nemours and Co. of Wilmington, Delaware, entitled "Tear Strength of Adiprene L Compounds," and dated Aug. 6, 1962.

With regard to compression set, the testing indicated that when urethane rubber pushers failed during testing it was not because of abrasive wear, which was what I had anticipated, though some wear did occur, but rather because the urethane took a permanent set. I have found that a relatively low compression set is desirable, preferably lying between 20–30 percent, in general the lower the better, with the maximum upper limit being 50 percent and the lowest 10 percent, as measured by the ASTM standards using the constant deflection test of "method B."

With regard to compression modulus, namely the amount of force, expressed in pounds per square inch, required to compress a sample a given percentage of its original height, I have found such should be relatively high and not less than 1,250 p.s.i. and preferably lying in the range of 2,500 to 4,500 p.s.i. at 25 percent deflection, and in general the higher the better.

The following are three examples of urethane rubber pushers tested and found to be satisfactory showing the aforementioned characteristics lying in the ranges outlined. Each of the pushers were designed to operate in a 1-inch Acme Automatic Screw Machine and accept three-fourths inch hexagonal bar stock. Each urethane block was placed in a tubular steel pusher shell locked in a fixed aluminum yoke on a test stand. Standard lengths of three-fourths inch hex steel bar attached to a reciprocating power source were inserted through the I.D. of the specimens and reciprocated therethrough. One cycle was counted for each back and forth motion with the length of each stroke approximately 6½ inches, which is about five times the average feed length for the bulk of parts run in automatic screw machines of this size. The stroke's feed was about 3 feet per second and the samples were continually lubricated by a dripping oiler with clean coating oil. The number of cycles to failure of the samples were counted, failure being determined when the sample could be shifted axially relative to the bar stock by an axial force of less than approximately 300 p.s.i. The characteristics of the three urethane blocks and their cycles to failure are shown below, with 75,000 cycles considered to be the minimum for satisfactory life.

Sample 1 had a tear strength of 350 pounds per linear inch, a compression modulus of 985 p.s.i. at 25 percent deflection and a compression set of 28 percent. In addition, this sample had a hardness shore "A" of 85, a tensile strength of 6,500 p.s.i., and an elongation of 660 percent. This sample failed at approximately 75,000 cycles.

Sample 2 had a split tear strength of 500 pounds per linear inch, a compression modulus of 2,500 p.s.i. at 25 percent deflection, and a compression set of 27 percent. In addition, it had a hardness shore "A" of 92, a tensile strength of 4,500 p.s.i., and an elongation of 450 percent. This sample failed at approximately 200,000 cycles.

The third sample had a split tear strength of 500 pounds per linear inch, a compression modulus of 1,100 p.s.i. at 25 percent deflection, and a compression set of 28 percent. In addition, this sample had a hardness shore "A" of 90, a tensile strength of 6,500 p.s.i., and an elongation of 550 percent. This sample failed at approximately 125,000 cycles.

The term "urethane rubber" as used herein is an elastomeric resin which may take the form of either a polyester cured with diamines or with polyalcohols (Glycols). A general description of the polyester resins is to be found in U.S. Pat. Nos. 2,620,616 and 2,729,618. Another basic type of resin utilizes a polyether instead of the polyester and a general description thereof will be found in U.S. Pat. No. 2,929,800.

What is claimed is:

1. A tubular pusher for use with a pusher shell on a feed tube in an automatic screw machine or the like comprising a urethane rubber body of tubular configuration adapted to be received in the shell and having an axially extending passageway adapted to telescopically receive bar stock for feeding the same during reciprocation of the pusher; said urethane having a tear strength lying in the range from 200 to 600 pounds per linear inch, a compression set lying in the range from 10 to 50 percent and a compression modulus lying in the range from 1,250 to 4,500 p.s.i. at 25 percent deflection.

2. The invention defined by claim 1 characterized in that urethane rubber has a tear strength lying in the range from 500 to 600 pounds per linear inch, a compression set lying in the range from 20 to 30 percent and a compression modulus lying in the range from 2,500 to 4,500 p.s.i. at 25 percent deflection.

3. A stock pusher for mounting on the end of a feed tube in an automatic screw machine or the like, comprising: a pusher shell including throughout at least the major portion of its length a circumferentially continuous rigid wall portion, a tubular block of urethane rubber mounted in the shell and having a bore concentric therewith and capable of elastic displacement upon insertion of a bar stock through the bore to grip the bar stock for feeding movements thereof and said urethane block in an axially extending surface thereof provided with a plurality of relief areas to allow for displacement of the urethane.

4. The invention defined by claim 3, characterized in that the exterior cylindrical surface of the urethane block is provided with said relieved areas.

5. The invention defined by claim 4 further characterized in that said relieved areas comprise axially extending grooves spaced apart about the periphery of the block.

6. The invention defined by claim 3 characterized in that said relieved areas are in the wall of the bore of the block.

7. The invention defined by claim 9 further characterized in that said relieved areas comprise grooves extending axially of the block in circumferentially spaced relation.

* * * * *

PO-1050
(5/69)

UNITED STATES PATENT OFFICE
CERTIFICATE OF CORRECTION

Patent No. 3,640,442   Dated February 8, 1972

Inventor(s) Gilbert T. Lyon

It is certified that error appears in the above-identified patent and that said Letters Patent are hereby corrected as shown below:

In column 6, line 61, change the numeral "9" to --6--.

Signed and sealed this 30th day of May 1972.

(SEAL)
Attest:

EDWARD M. FLETCHER, JR.
Attesting Officer

ROBERT GOTTSCHALK
Commissioner of Patents